United States Patent
Wigren et al.

(10) Patent No.: US 11,722,967 B2
(45) Date of Patent: Aug. 8, 2023

(54) TRANSMISSION POWER CONTROL FOR A RADIO BASE STATION

(71) Applicant: Telefonaktiebolaget LM Ericsson (publ), Stockholm (SE)

(72) Inventors: Torbjörn Wigren, Uppsala (SE); William Hogan, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 17/296,972

(22) PCT Filed: Nov. 26, 2018

(86) PCT No.: PCT/SE2018/051214
§ 371 (c)(1),
(2) Date: May 25, 2021

(87) PCT Pub. No.: WO2020/111987
PCT Pub. Date: Jun. 4, 2020

(65) Prior Publication Data
US 2022/0007301 A1 Jan. 6, 2022

(51) Int. Cl.
*H04W 52/22* (2009.01)
*H04W 52/14* (2009.01)
(Continued)

(52) U.S. Cl.
CPC ....... *H04W 52/225* (2013.01); *H04W 52/143* (2013.01); *H04W 52/267* (2013.01); *H04J 13/20* (2013.01)

(58) Field of Classification Search
CPC ............ H04W 52/225; H04W 52/143; H04W 52/267; H04J 13/20
See application file for complete search history.

(56) References Cited

U.S. PATENT DOCUMENTS

| | | | |
|---|---|---|---|
| 2001/0008542 A1 | 7/2001 | Wiebke et al. | |
| 2002/0012332 A1* | 1/2002 | Tiedemann, Jr. | ... H04W 52/346 370/335 |

(Continued)

FOREIGN PATENT DOCUMENTS

| | | | |
|---|---|---|---|
| JP | 2006254174 A | * | 9/2006 |
| WO | 0193620 A1 | | 12/2001 |

(Continued)

OTHER PUBLICATIONS

Berggren, "Power Control and Adaptive Resource Allocation in DS-CDMA Systems", Jun. 2003, Dissertation Submitted to the Royal Institute of Technology in partial fulfillment of the requirements for the degree of Doctor of Philosophy, p. 121. (Year: 2003).*

(Continued)

*Primary Examiner* — Michael K Phillips
(74) *Attorney, Agent, or Firm* — Nicholson De Vos Webster & Elliott LLP

(57) ABSTRACT

Mechanisms for controlling total average transmission power of a radio base station over a fixed time period. A method is performed by a control device. The method comprises obtaining values of average total transmission power of at least one previous transmission from the radio base station. The method comprises determining a resource factor value from the value of average total transmission power and a setpoint value of the average total transmission power. The method comprises determining, based on the resource factor value, an action that restricts the amount of code-division multiple access (CDMA) resources to be used at least for a current transmission. The method comprises controlling the total average transmission power over the fixed time period by initiating the determined action at least for the current transmission.

20 Claims, 8 Drawing Sheets

(51) Int. Cl.
*H04W 52/26* (2009.01)
*H04J 13/20* (2011.01)

(56) References Cited

U.S. PATENT DOCUMENTS

| | | | |
|---|---|---|---|
| 2004/0114555 A1* | 6/2004 | Hayashi | H04L 1/0002 370/468 |
| 2004/0160923 A1* | 8/2004 | Nobukiyo | H04W 28/18 370/335 |
| 2005/0113106 A1* | 5/2005 | Duan | H04W 28/22 455/67.11 |
| 2005/0226267 A1 | 10/2005 | Pedersen et al. | |
| 2006/0239334 A1* | 10/2006 | Kwon | H04B 1/713 375/132 |
| 2008/0214196 A1* | 9/2008 | Sambhwani | H04W 52/267 455/446 |
| 2010/0214988 A1* | 8/2010 | De Pasquale | H04W 72/1289 370/328 |
| 2012/0294291 A1* | 11/2012 | Su | H04W 24/10 370/336 |
| 2016/0157236 A1 | 6/2016 | Wiberg et al. | |

FOREIGN PATENT DOCUMENTS

| | | | | |
|---|---|---|---|---|
| WO | WO-0207339 A2 * | 1/2002 | | H04B 1/7103 |
| WO | 02054604 A2 | 7/2002 | | |
| WO | 2012060750 A1 | 5/2012 | | |
| WO | WO-2014008915 A1 * | 1/2014 | | H04L 41/0816 |
| WO | 2019/194714 A1 | 10/2019 | | |
| WO | 2019/194721 A1 | 10/2019 | | |

OTHER PUBLICATIONS

Hamabe et al., "Method for assigning spreading code, program threfor, radio channel control station, and mobile communication system", Sep. 21, 2006, JP, English translation of JP 2006254174. (Year: 2006).*
Sherzer et al., "Directed maximum ratio combining methods and systems for high data rate traffic", Jan. 24, 2002, WO, English translation of WO 0207339. (Year: 2002).*
International Search Report and Written Opinion for Application No. PCT/SE2018/051214, dated Oct. 14, 2019, 18 pages.
International Preliminary Report on Patentability for Application No. PCT/SE2018/051214, dated Jun. 10, 2021, 13 pages.
Invitation to Pay Additional Fees for PCT/SE2018/051214, dated Aug. 20, 2019, 12 pages.
Communication pursuant to Article 94(3) EPC, EP App. No. 18816280. 4, dated Apr. 24, 2023, 6 pages.

* cited by examiner

TRANSMISSION POWER CONTROL FOR A RADIO BASE STATION

CROSS-REFERENCE TO RELATED APPLICATIONS

This application is a National stage of International Application No. PCT/SE2018/051214, filed Nov. 26, 2018, which is hereby incorporated by reference.

TECHNICAL FIELD

Embodiments presented herein relate to a method, a control device, a computer program, and a computer program product for controlling total average transmission power of a radio base station over a fixed time period.

BACKGROUND

When any radio equipment is to be deployed, regulatory radio frequency (RF) electromagnetic field (EMF) exposure requirements should be accounted for. These RF EMF exposure regulations may typically be based on international guidelines and standards from for example the International Commission on Non-Ionizing Radiation Protection (IC-NIRP) but may take different forms in some countries and regions. An aim of the RF EMF exposure regulations is to secure that the human exposure to RF energy is kept within prescribed limits, which typically have been set with wide safety margins.

Some newly developed radio base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a radio base station on the network side and a terminal device at the user-side by means of so-called multiple-input-multiple-output (MIMO) transmission.

For radio base stations and other radio equipment having AAS systems with a large number of transmitters in order to achieve a high directivity, when emissions are correlated between the transmitters then there could be a large beamforming gain. A consequence of increasing beamforming gain is that the radiated energy is concentrated in directional beams, in which the Equivalent Isotropic Radiated Power (EIRP), i.e. the power radiated from an antenna with unity antenna gain in all directions, is increased as compared to the situation without AAS systems.

The RF EMF exposure limits are typically expressed in terms of power density (in units of $W/m^2$) which in the far field is proportional to the EIRP. Consequently, the EIRP can be used to determine the power density in the far field. This implies that the experienced momentary EIRP, and the resulting power density at a given distance from the antenna, will be higher in a beam generated by an AAS system with beam forming gain, than without such an AAS system.

The ICNIRP and other RF EMF exposure limitations are commonly expressed as an average power density over a specified time interval T. This means that the momentary power density can be significantly higher during a shorter time than T, however the time-averaged power density over any time period T must be below the specified limit. To maintain a certain RF EMF exposure compliance distance (or boundary), that is shorter (or smaller) than what is obtained using the maximum EIRP of the AAS, the time-averaged power needs to be maintained at or below a pre-determined threshold or a set of pre-defines thresholds for different beam directions.

Hence, there may be a need for efficient control of the average transmitted power for radio base stations and other radio equipment.

SUMMARY

An object of embodiments herein is to provide efficient control of the average transmitted power for radio base stations and other radio equipment.

According to a first aspect there is presented a method for controlling total average transmission power of a radio base station over a fixed time period. The method is performed by a control device. The method comprises obtaining values of average total transmission power of at least one previous transmission from the radio base station. The method comprises determining a resource factor value from the value of average total transmission power and a setpoint value of the average total transmission power. The method comprises determining, based on the resource factor value, an action that restricts the amount of code-division multiple access (CDMA) resources to be used at least for a current transmission. The method comprises controlling the total average transmission power over the fixed time period by initiating the determined action at least for the current transmission.

According to a second aspect there is presented a control device for controlling total average transmission power of a radio base station over a fixed time period. The control device comprises processing circuitry. The processing circuitry is configured to cause the control device to obtain values of average total transmission power of at least one previous transmission from the radio base station. The processing circuitry is configured to cause the control device to determine a resource factor value from the value of average total transmission power and a setpoint value of the average total transmission power. The processing circuitry is configured to cause the control device to determine, based on the resource factor value, an action that restricts the amount of CDMA resources to be used at least for a current transmission. The processing circuitry is configured to cause the control device to control the total average transmission power over the fixed time period by initiating the determined action at least for the current transmission.

According to a third aspect there is presented a control device for controlling total average transmission power of a radio base station over a fixed time period. The control device comprises an obtain module configured to obtain values of average total transmission power of at least one previous transmission from the radio base station. The control device comprises a determine module configured to determine a resource factor value from the value of average total transmission power and a setpoint value of the average total transmission power. The control device comprises a determine module configured to determine, based on the resource factor value, an action that restricts the amount of CDMA resources to be used at least for a current transmission. The control device comprises a control module configured to control the total average transmission power over the fixed time period by initiating the determined action at least for the current transmission.

According to a fourth aspect there is presented a computer program for controlling total average transmission power of a radio base station over a fixed time period, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient control of the average transmitted power for the radio base station.

Advantageously, when the radio base station, e.g. a 3G CDMA base station, is placed at the same geographical position as, or co-sited with, other radio base stations e.g. of 4G or 5G type equipped with AAS, the size of the total RF EMF compliance boundary of all co-sited radio base stations may be reduced, as compared to the situation when the herein disclosed embodiments are not implemented. This simplifies, or even makes possible, deployment of 4G or 5G radio base stations with AAS in cases where the size of the RF EMF exclusion zones is not feasible.

Advantageously, the capacity of co-sited radio base stations with AAS can be improved.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
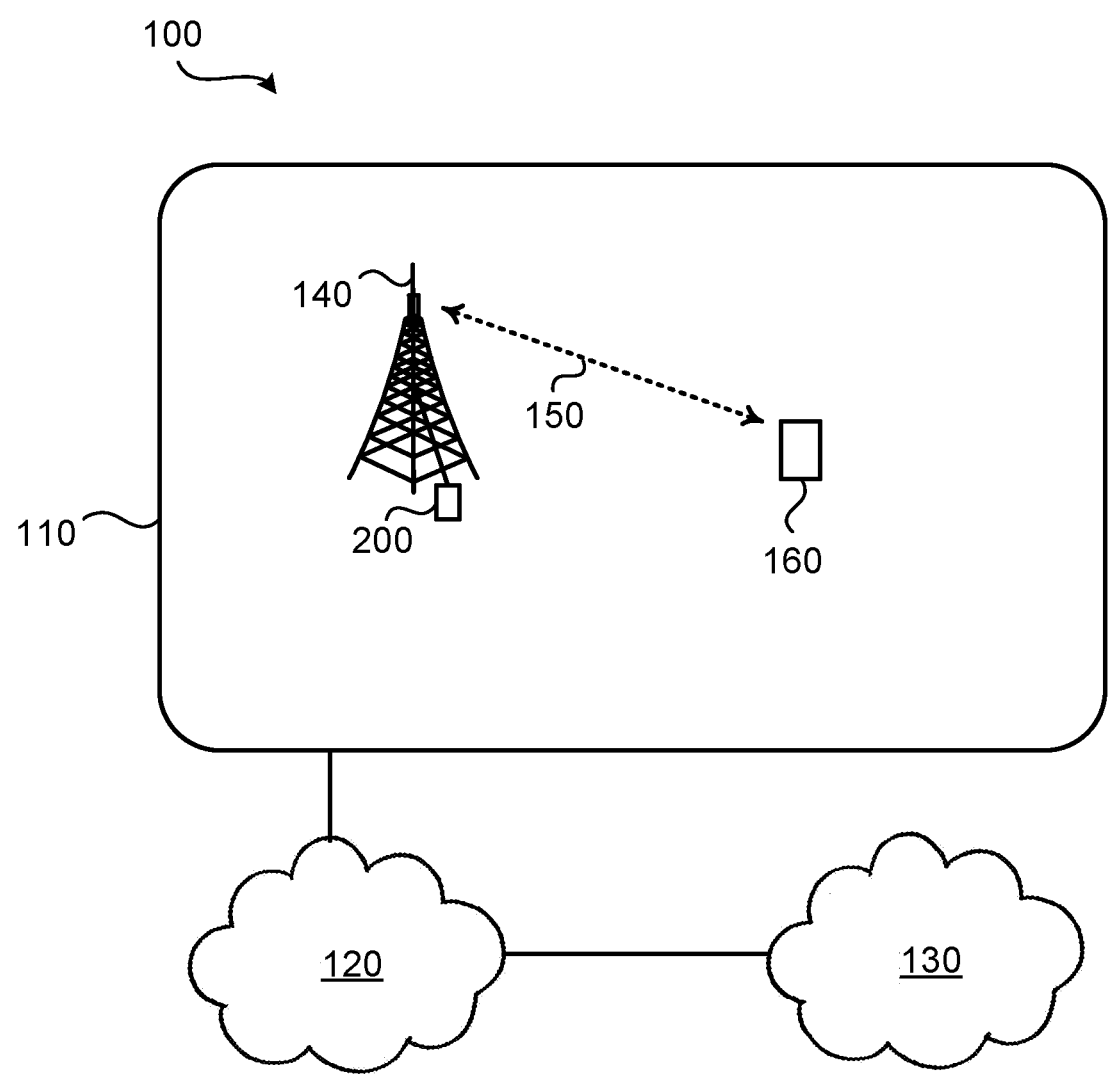
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunication system, a fourth generation (4G) telecommunication system, or a fifth (5G) telecommunication system and support any 3GPP telecommunications standard, where applicable.

The communications network 100 comprises a control node 200 configured to control a radio base station 140 that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the network node, access services of, and exchange data with, the service network 130.

Examples of radio base stations 140 are radio access network nodes, radio base stations, base transceiver stations, Node Bs, evolved Node Bs, g Node Bs, access points, access nodes, transmission and reception points, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control node 200 might comprise, be collocated with, integrated with, or be in operational communications with, the radio base stations 140.

The radio base station 140 might be configured to collocate the transmission of the CDMA resources with transmission of further resources in a 4G telecommunication system and/or a 5G telecommunication system.

As mentioned above there is a need for efficient control of the average transmitted power for the radio base station 140. In this respect, 3G telecommunication systems may be co-sited with 4G and/or 5G telecommunication systems equipped with AAS. These AAS increase the capacity and/or coverage of existing wireless networks by addition of an antenna array. This enables simultaneous transmission of parallel data streams, so called multiple-input-multiple-output (MIMO) transmission, between the radio base station 140 and the terminal device 160. In some cases, such as when millimeter-wave (mmW) carrier frequencies are used, the main desired effect is rather to enhance coverage by exploiting the high beamforming gain achieved by using AAS.

In particular, when 3G telecommunication systems are co-sited with 4G and/or 5G telecommunication systems equipped with AAS, the power density contributions of all radio access technologies shall, according to regulations, be taken into account when assessing the compliance with RF EMF limits. This means that a certain transmission power budget may be needed to be allocated to the 3G telecommunication system, which in some situations, and depending on the site design, may imply a need for a power back-off function in the 3G telecommunication system. Otherwise deployment of 4G and/or 5G telecommunication systems, when using 3G co-siting, may become difficult and/or infeasible.

3G telecommunication systems based on code division multiple access (CDMA) do not utilize orthogonal frequency division duplex (OFDM) transmission, and therefore the actuator mechanisms needed for CDMA power back-off cannot be the same as power back-off mechanism for used for 4G and/or 5G telecommunication systems in which a limitation of the number of physical resource blocks (PRBs) can be used for power regulation.

At least some of the embodiments disclosed herein relate to mechanisms for ensuring that the time-averaged transmitted power is below a threshold value determined to fulfil above mentioned regulatory restrictions for radio base stations 140 and other radio equipment based on CDMA. The embodiments disclosed herein in particular relate to mechanisms for controlling total average transmission power of a radio base station 140 over a fixed time period. In order to obtain such mechanisms there is provided a control device 200, a method performed by the control device 200, a computer program product comprising code, for example in the form of a computer program, that when run on a control device 200, causes the control device 200 to perform the method.

Figure 2:
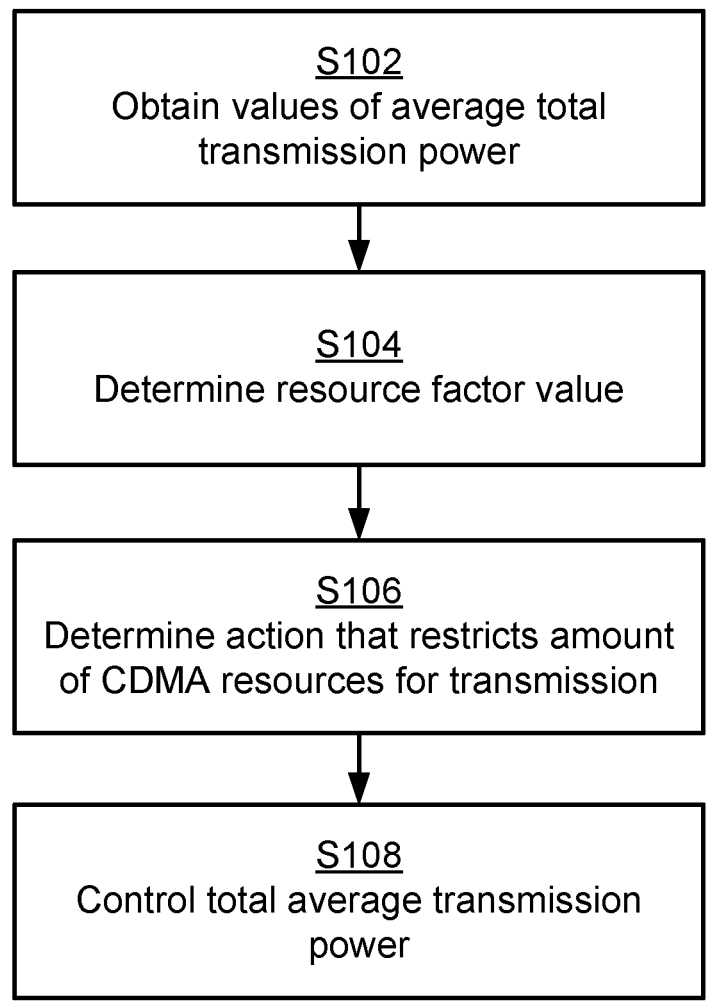
FIG. 2 is a flowchart of methods according to embodiments.

FIG. 2 is a flowchart illustrating embodiments of methods for controlling total average transmission power of a radio base station 140 over a fixed time period. The methods are performed by the control device 200. The methods are advantageously provided as computer programs 1220.

S102: The control device 200 obtains values of average total transmission power of at least one previous transmission from the radio base station 140.

S104: The control device 200 determines a resource factor value $\gamma(t)$ from the value of average total transmission power and a setpoint value $\langle P_{tot} \rangle^{ref}$ of the average total transmission power.

S106: The control device 200 determines, based on the resource factor value $\gamma(t)$, an action that restricts the amount of CDMA resources to be used at least for a current transmission.

S108: The control device 200 controls the total average transmission power over the fixed time period by initiating the determined action at least for the current transmission.

Embodiments relating to further details of controlling total average transmission power of a radio base station 140 over a fixed time period as performed by the control device 200 will now be disclosed.

There could be different values of the fixed time period over which the total average transmission power of the radio base station 140 is controlled. According to an example, the fixed time period takes a value in the interval 4 to 30 minutes. One typical value of the fixed time period is 6 minutes. However, the fixed time period might be shorter, such as between 1 to 3 minutes or even less than 1 minute, but still at least an order of magnitude longer, or even many orders of magnitude longer, than the transmission time interval (TTI) used for downlink transmission from the radio base station 140. The fixed time period could either be static or configurable and thus be updated as needed.

In some examples the CDMA resources are to be transmitted in a wideband CDMA (WCDMA) system or in a high speed packet access (HSPA) system. WCDMA systems and HSPA systems are both examples of 3G telecommunication systems.

In some aspects, in order to get a smooth behavior of the limiting resource threshold applied in the scheduler to limit the total average transmission power, it might be rate controlled. That means that the control signal commands adjustments to the limiter, making it increase or decrease, typically in small steps. The dynamics of the actuator mechanism might therefore be determined to be:

$$\dot{\gamma}(t)=u(t),$$

where $\gamma(t)$ is the resource factor value and where $u(t)$ is the control signal further discussed below. The resource threshold is decoupled from the scheduler algorithms themselves, and just expresses a fractional limitation of the scheduler not to use more than a fraction $\gamma(t)$ of its total resources. Particularly, according to an embodiment, the resource factor value $\gamma(t)$ expresses which fraction of all available CDMA resources to be used for the current transmission, and wherein the action restricts the amount of CDMA resources to said fraction of all available CDMA resources.

As will be further disclosed next, in terms of CDMA resources the scheduler might then limit the number of code resources it uses, or limit the fraction of the TTI used for downlink transmission, or enforcing a coding rate that allows a lower SINR of the transmission (for fixed number of users), or using any combination thereof.

Figure 3:
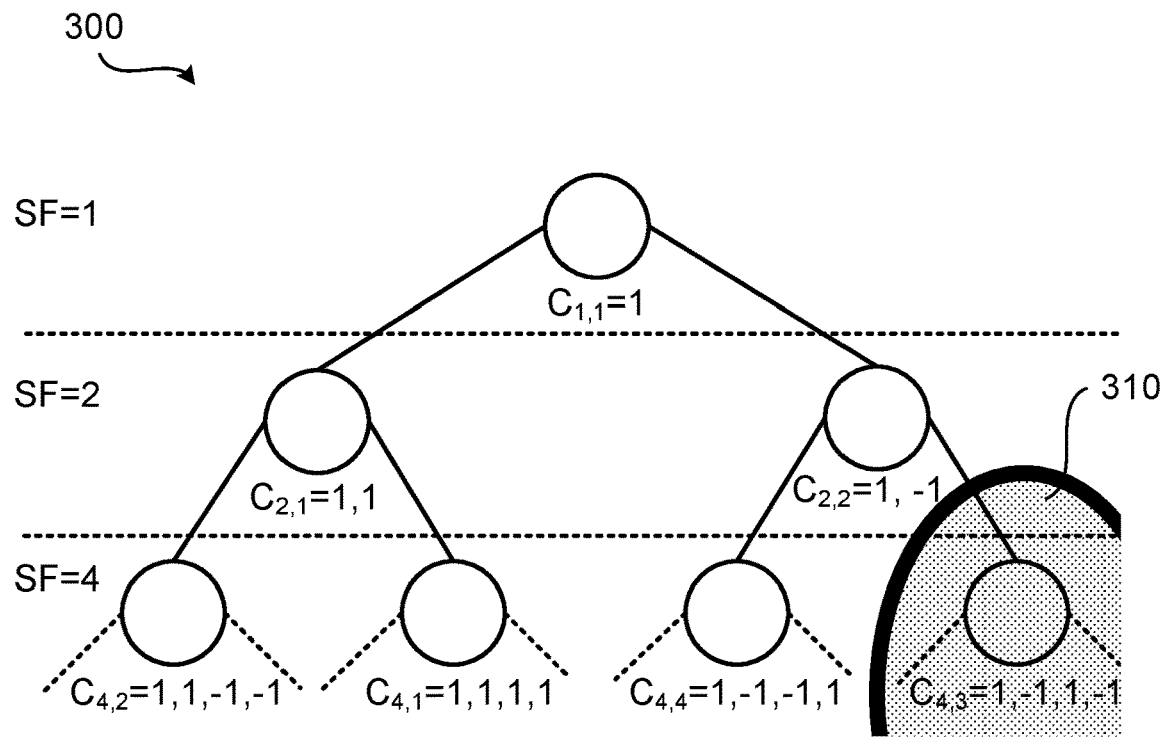
FIG. 3 schematically illustrates a code tree according to an embodiment.

A first embodiment relating to code allocation limitation will now be disclosed with intermediate reference to FIG. 3. FIG. 3 schematically illustrates a code tree 300 for spreading factors (SF) 1, 2, and 4. The code tree 300 does however branch out further below what is shown, down to SF=512. Each branch of the tree contains a code ($C_{1,1}$, $C_{2,1}$, $C_{2,2}$, $C_{4,1}$, $C_{4,2}$, $C_{4,3}$, $C_{4,4}$) that is orthogonal to those of the other branches for the same SF, providing that there is no significant multi-path in the radio propagation. Thus, simultaneous low rate speech signal users can e.g. be allocated to single nodes (codes) of the tree using spreading factors of say 256 or 512, corresponding to tree levels of $\log_2(x)$, where $x$ equals 256 or 512. Since these codes are orthogonal, the speech signal symbols of each user are spread by multiplication with each code chip, producing signals that are orthogonal and can hence be added and transmitted over the air interface, and detected and decoded at the receiving end. A determined limitation by means of $\gamma(t)$, could then be implemented by a suitable limitation of the code tree 300. The fraction $\gamma(t)$ could then determine exactly how large parts of the code tree 300 that is blocked for users. In FIG. 3 this is illustrated at 310 which indicates a part of the code tree 300 that is blocked for usage. Particularly, according to an embodiment, the CDMA resources are associated with codes in a code tree 300, and the action in step S106 involves restricting how many of the codes in the code tree 300 that are available for the current transmission. FIG. 3 illustrates a case where the value of $\gamma(t)$ equals 0.75, and hence 25% of the code tree 300 needs to be blocked from transmission. This blocking can be implemented in many ways, by blocking different parts of the code tree 300, following rules for that allocation that are well known in prior art. The finest possible quantization, disregarding the control channels, is $\frac{1}{512}$. To perform the blocking a feasible fraction of the code tree needs to be selected that corresponds as closely as possible to $\gamma(t)$. In some examples a set of preferred blocking configurations of the code tree 300 is tabulated against the corresponding of $\gamma(t)$, for of $\gamma(t)$ that represent feasible fractions of code tree blocking configurations.

Figure 4:
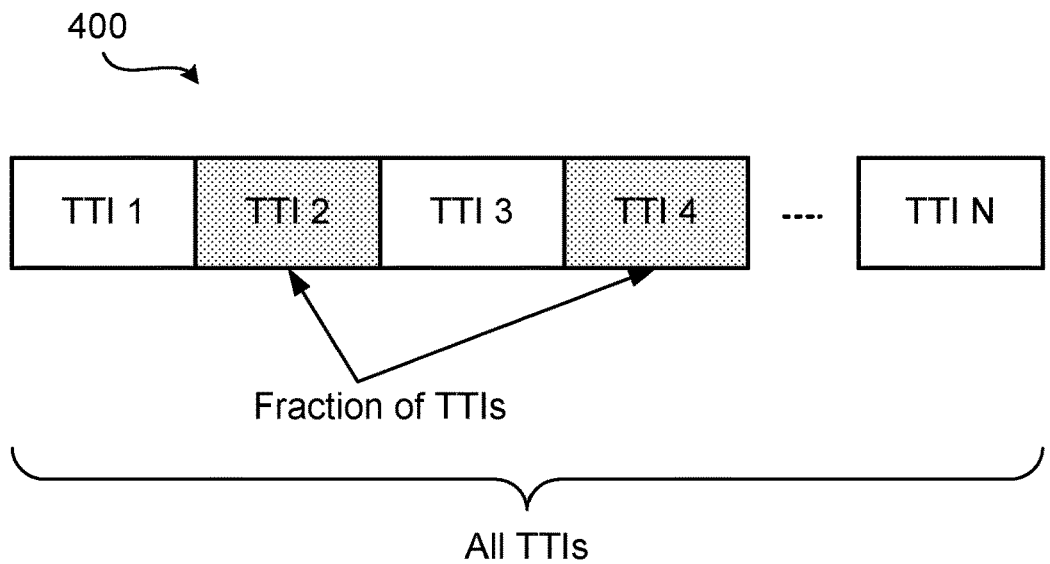
FIG. 4 schematically illustrates transmission time intervals according to an embodiment.

A second embodiment relating to user allocation limitation for certain TTIs will now be disclosed with intermediate reference to FIG. 4. FIG. 4 schematically illustrates N TTIs 400 according to an embodiment. A fraction of all the TTIs (in the illustrative example of FIG. 4 defined by TTI 2 and TTI 4), typically repeatedly, according to the current value of γ(t) could be blocked. In the case of γ(t)=0.75, every fourth TTI could be blocked from data transmission. This is appropriate because the averaging time for the RF EMF exposure limitation is typically much longer than a single TTI meaning that the update rate of γ(t) is much slower than the duration of one TTI (which typically is in the order of 2-10 ms). Particularly, according to an embodiment, the CDMA resources are associated with transmission time intervals, TTIs, 400 and wherein the action involves restricting the current transmission to a fraction of the TTIs 400.

A third embodiment relating to rate restriction per user will now be disclosed. In some aspects the users are allocated a lower data rate than what has been determined. Particularly, according to an embodiment, the CDMA resources are associated with a user data rate, and wherein the action involves using a user data rate lower than that determined for the current transmission.

A fourth embodiment relating to using a code rate with more redundancy will now be disclosed. In general terms, different services might require certain signal to interference plus noise ratios (SINRs) for successful detection and decoding, given a certain coding rate. Outer and inner power control loops contribute to the achievement of the requested SINR. In case a lower SINR is needed, then the total average transmission power would also be reduced. To exploit this for RF exposure control, given the value of γ(t), the user could be assigned a correspondingly higher coding rate, thereby using a lower SINR.

Particularly, according to an embodiment, the CDMA resources are associated with a code rate and wherein the action involves using a code rate higher than needed for the current transmission.

The action determined in step S106 could either be for a single user or for a group of users. Each user could correspond to a terminal device 160. Particularly, according to an embodiment, the radio base station 140 serves a group of terminal devices 160, and wherein the action is collectively determined for all terminal devices 160 in the group of terminal devices 160. According to an embodiment, the action is individually determined for at least one terminal device 160 in the group of terminal devices 160.

There could be different ways to determine which CDMA resources to restrict, regardless of which of the first, second, third, and fourth embodiments disclosed above are applied. For example, the CDMA resources could be allocatable for transmission of control signalling and data signalling. In some aspects reduction of CDMA resourced for downlink data (e.g. for best effort services) is prioritized. Particularly, according to an embodiment, the restriction of amount of CDMA resources is most prioritized for those of the CDMA resources that are allocatable for transmission of at least one of data signalling and voice signalling. In some aspects the CDMA resources used for control are reduced as little as possible. Particularly, according to an embodiment, the restriction of amount of CDMA resources is least prioritized for those of the CDMA resources that are allocatable for transmission of control signalling.

In some aspects the resource factor value γ(t) is set to its minimum value when the value of average total transmission power is larger than a power threshold value. In more detail, the maximum value of γ(t) is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

Thus, according to an embodiment, the resource factor value γ(t) is lower-bounded by a minimum value $0 \leq \gamma_{low}$ and upper-bounded by 1.

In some aspect the values of average transmission power are based on measurements. Particularly, according to an embodiment, the values of average transmission power are based on measurements made at, or close to, the input to an antenna array of the radio base station 140. In this respect, the total output power of an antenna array, over all antenna elements of the antenna array, can be measured in the radio equipment, just before the antenna elements. In some examples this can be done by couplers that measure the radio signal amplitude at each signal path to an antenna element. These amplitudes can then be combined into a total output power of the radio equipment, with the antenna gain removed. Based on such measurements, the averaged power can be constructed by integration as follows:

$$\langle P_{tot}\rangle(t) = \frac{1}{T}\int_{t-T}^{t} P_{tot}(\tau)d\tau,$$

where $P_{tot}(\tau)$ denote the value of total transmission power at time index τ.

In other aspects the values of average transmission power are predicted. For example, the values of average transmission power can be predicted using information available in the scheduler or elsewhere in baseband. Such a quantity could be obtained, e.g. by summing up the momentary scheduled power as estimated by the fraction of resources used at each time instant t, over a period of time T.

There could be different types of controllers used in step S108. In some aspects the controller is of proportional-derivative (PD) type. That is, according to an embodiment the controlling in step S108 is of PD type.

In some aspects the controller is of derivative (D) type. That is, according to an embodiment the controlling in step S108 is of D type. Thus, in some aspects only differential control is allowed.

In some aspects a supervision mechanism is employed for enabling and disabling the proposed actuator and feedback control mechanisms. That is, according to an embodiment the controlling in step S108 is selectively enabled and disabled. There could be different ways to determine when to enable and disable the control. In some aspects a comparison to threshold values is made in order to determine when to enable and disable the control. In some examples, performing the control (as in step S108) is enabled when when $\langle P_{tot}\rangle(t) > \delta_1 P_{max,site}$, whereby γ(t) is set to γ(t)=1, and performing the control (as in step S108) is disabled when $\langle P_{tot}\rangle(t) < \delta_2 P_{max,site}$. In some aspects the values fulfil: $\delta_2 P_{max,site} \leq \langle P_{tot}\rangle^{ref} \leq \delta_1 P_{max,site}$, where $P_{max,site}$ denotes the maximum transmission power of the site comprising the site.

Figure 5:
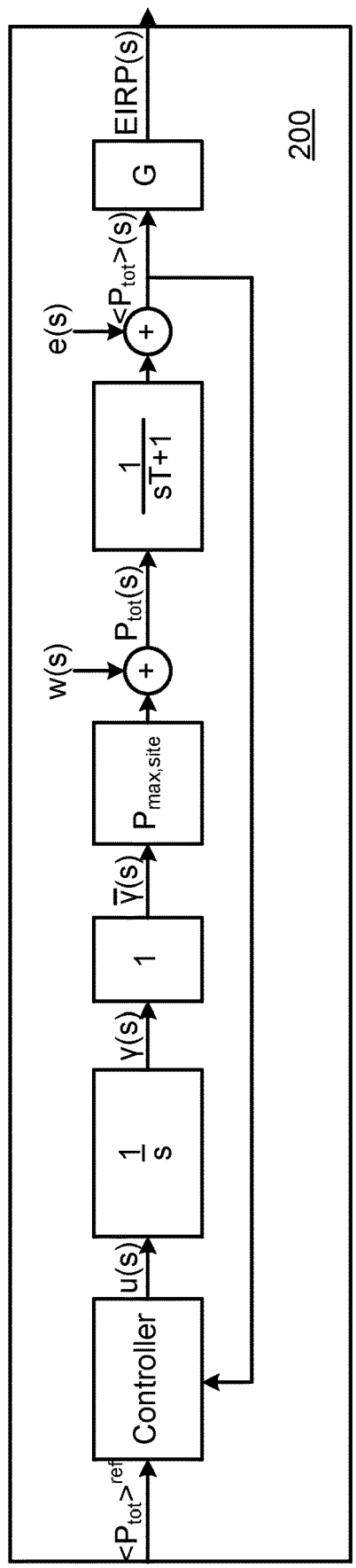
FIGS. 5, 6, 7 are block diagrams of a control device according to embodiments.

FIG. 5 is a block diagram of the control node 200 where feedback control has been enabled by the supervision mechanism. In FIG. 5, $\langle P_{tot}\rangle^{ref}$ denotes the setpoint for the averaged power (typically slightly less than the threshold value), 1/s denotes the actuator dynamics with lower and upper limits inactive, γ(t) denotes the resource factor value after lower and upper limitation (inactive in FIG. 5), $P_{max,site}$ denotes the maximal total power of the radio base station 140, w(s) denotes a disturbance representing predicted power errors, $1/(sT+1)$ represents an autoregressive simplified model of the averaging, $\langle P_{tot}\rangle(s)$ denotes the averaged total power, G denotes the antenna gain of the radio base station 140 and EIRP(s) denotes the EIRP. All quantities are in FIG. 5 expressed in the Laplace transform domain, which is allowed since the feedback control mechanism design is performed with constraints inactive.

In some aspects the controller block is given by:

$$u(s) = CT(1+T_D s)(\langle P_{tot}\rangle^{ref} - \langle P_{tot}\rangle(s)).$$

A control node 200 implementing this controller block is of PD type. C denotes the proportional gain, and $T_D$ the differentiation time. The poles of the closed loop system of FIG. 5 are given by the following second order equation:

$$s^2 + (1/T + P_{max,site} C T_D)s + P_{max,site} C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2 + (\alpha_1 + \alpha_2)s + \alpha_1 \alpha_2 = 0.$$

An identification of coefficients and solution of the resulting system of equations reveal that the proportional gain and differentiation time shall be selected as:

$$C = \frac{\alpha_1 \alpha_2}{P_{max,site}},$$

and:

$$T_D = \frac{\alpha_1 + \alpha_2 \frac{1}{T}}{\alpha_1 \alpha_2}.$$

One reason for this choice is that a system with two negative real poles can be expected to be well damped, which is a result of a significant differentiation action. This might be advantageous when differentiation action is needed for fast back-off close to the determined threshold.

To implement the feedback control mechanism, $\langle P_{tot}\rangle^{ref}$, $\langle P_{tot}\rangle(t)$ and $\langle P'_{tot}\rangle(t)$ are needed. The first two quantities can be obtained as described above, while the second quantity might be estimated. This can e.g. be achieved by autoregressive filtering of $\langle P_{tot}\rangle(t)$ with the filter given by:

$$\langle \dot P_{tot}\rangle(s) = \frac{\alpha s}{s+\alpha}\langle P_{tot}\rangle(s).$$

In order to further emphasize the back-off control performance only negative differential control action might be allowed. This could reduce the resource factor value $\gamma(t)$, meaning that only negative contributions from the second term of the feedback mechanism should be allowed. This means that in the time domain, the following restriction to the derivative $\langle P'_{tot}\rangle(t)$ is applied:

$$u(t) = C(\langle P_{tot}\rangle^{ref} - \langle P_{tot}\rangle(t)) - CT_D \max(0, \langle P'_{tot}\rangle(t)).$$

Sometimes it may happen that the feedback control mechanism is not fast enough to prevent a small overshoot of the determined power threshold. To prevent that from occurring, a hard back-off is superimposed over the disclosed feedback control mechanism. This hard back-off operates by setting the resource factor value $\gamma(t)$ to its minimum value $\gamma_{low}$ whenever:

$$\langle P_{tot}\rangle(t) > \text{margin} \cdot P_{max},$$

where margin is a value slightly below 1 and where $P_{max}$ is the determined maximum average power threshold.

Figure 6:
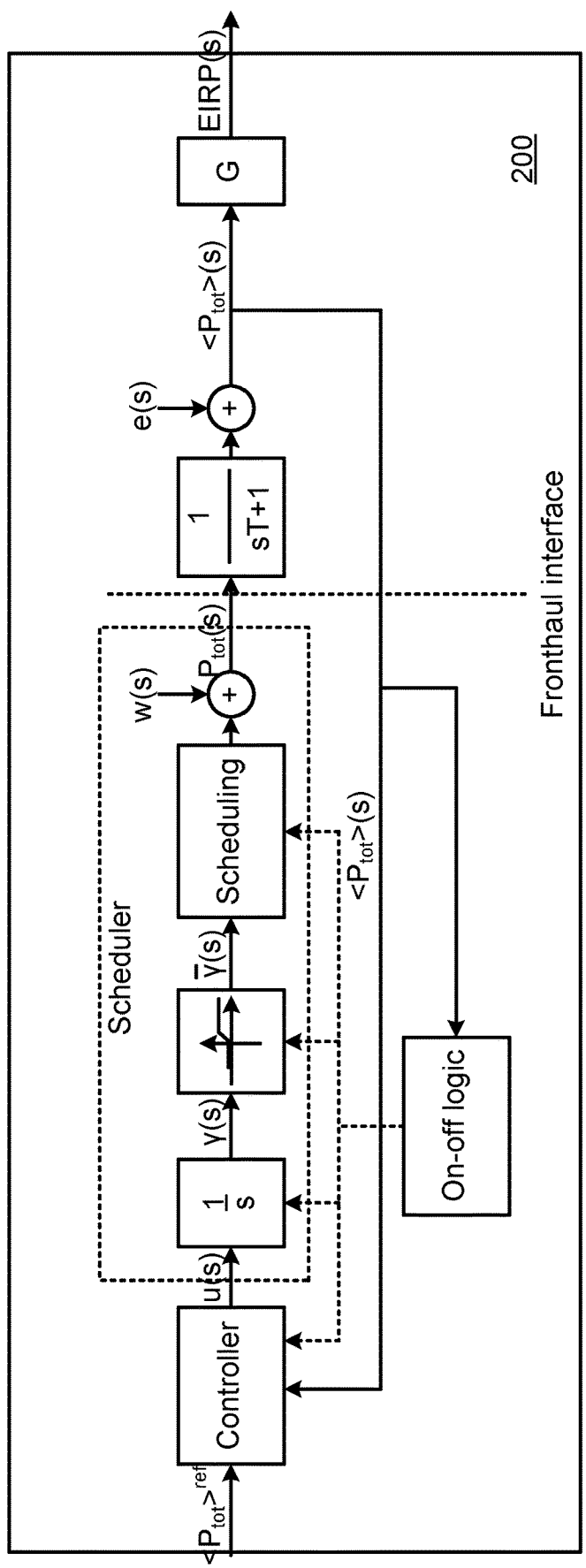
Figure 7:
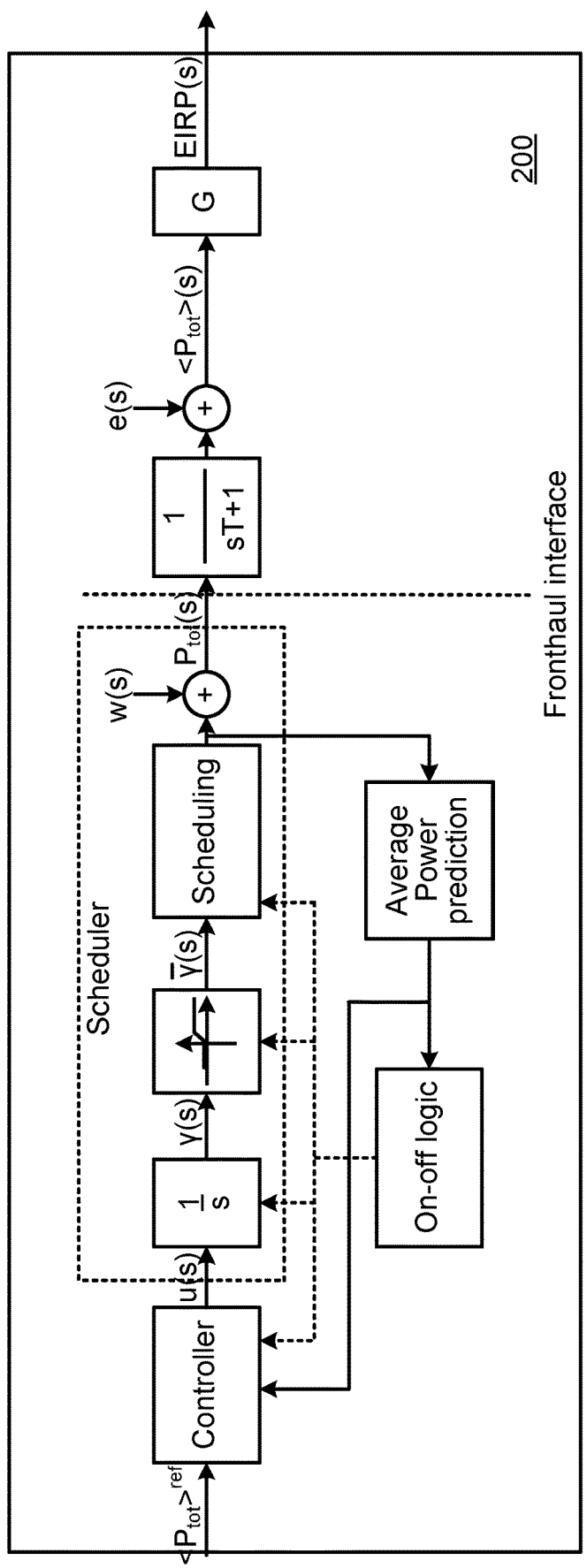

As stated above, an advantage with the present embodiments is that it is able to operate both with predicted and measured average power signals. This is illustrated with FIG. 6 and FIG. 7. FIG. 6 is a block diagram of an architecture of the control node 200 where measured averaged total power feedback from the AAS system of the radio is used. FIG. 7 is a block diagram of an architecture of the control node 200 where predicted averaged total power is used.

In FIG. 6 the momentary measured power in the radio is the input to the average per beam direction power block. FIG. 7 illustrates an alterative where a predicted power in base band provides the input.

The remaining parts of FIGS. 6 and 7 are common. When activated, the resulting average total average power $\langle P_{tot}\rangle(s)$ is sent to the controller block, where in one example PD control is applied to the control error formed by $\langle P_{tot}\rangle(s)$ and the reference value $\langle P_{tot}\rangle(s)^{ref}$, thereby generating the control signal u(s). The control signal affects the dynamic threshold in the scheduler, represented by the integration 1/s. To secure that the relative dynamic threshold stays between $\gamma_{low}$ and 1, the limiting block transforms $\gamma(t)$ to the final relative dynamic threshold $\bar\gamma(t)$. The scheduler then performs data traffic scheduling, accounting for $\bar\gamma(t)$, thereby producing the data transmission which closes the loop.

In FIGS. 6 and 7 there is a block denoted on-off logic. The on-off logic is configured to make sure that the control loop is disabled when not needed and enabled when needed. In one example this is implemented using two relative thresholds, $\delta_1$ and $\delta_2$, that 1) enables the actuator and feedback control mechanisms when $\langle P_{tot}\rangle(t) > \delta_1 P_{max,site}$, and sets $\gamma(t)=1$, and 2) disables the actuator and feedback control mechanisms when $\langle P_{tot}\rangle(t) < \delta_2 P_{max,site}$. In some aspects the values fulfil: $\delta_2 P_{max,site} \le \langle P_{tot}\rangle^{ref} \delta_1 P_{max,site}$, where $P_{max,site}$ denotes the maximum transmission power of the site.

Figure 8:
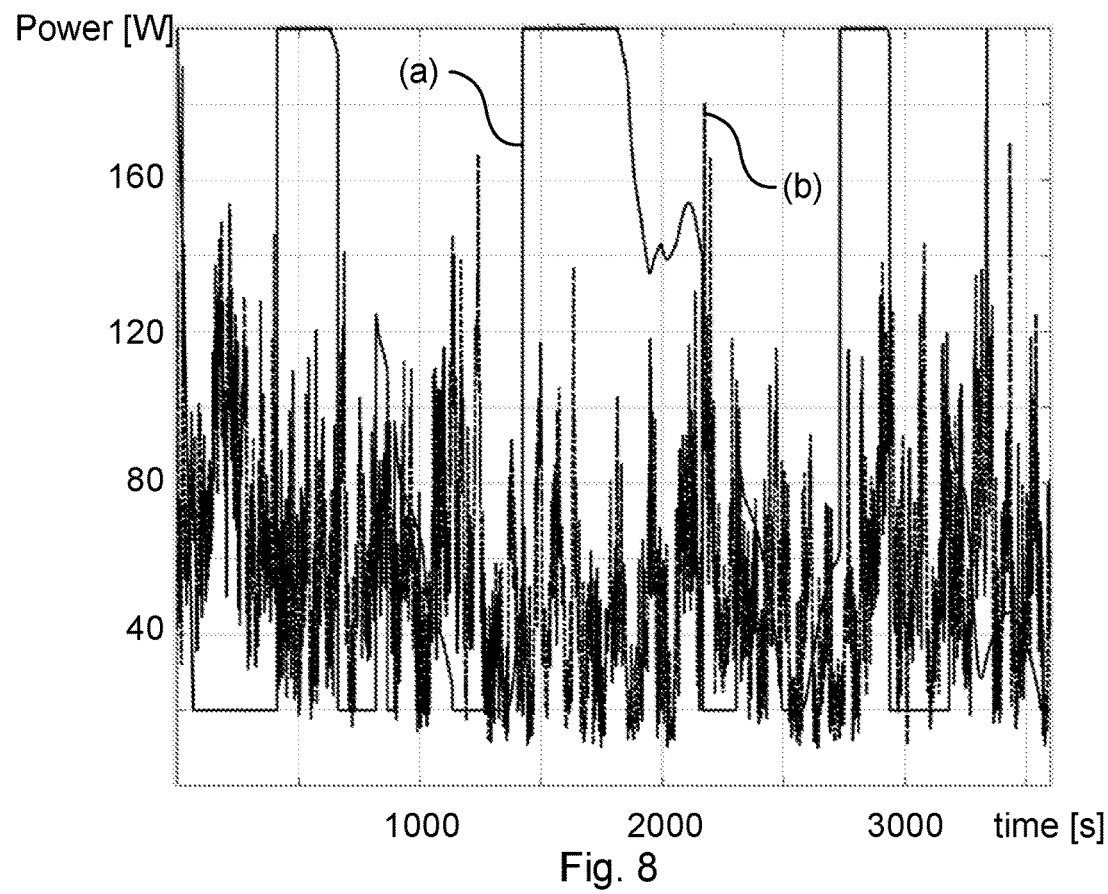
FIGS. 8 and 9 show simulation results according to embodiments.
Figure 9:
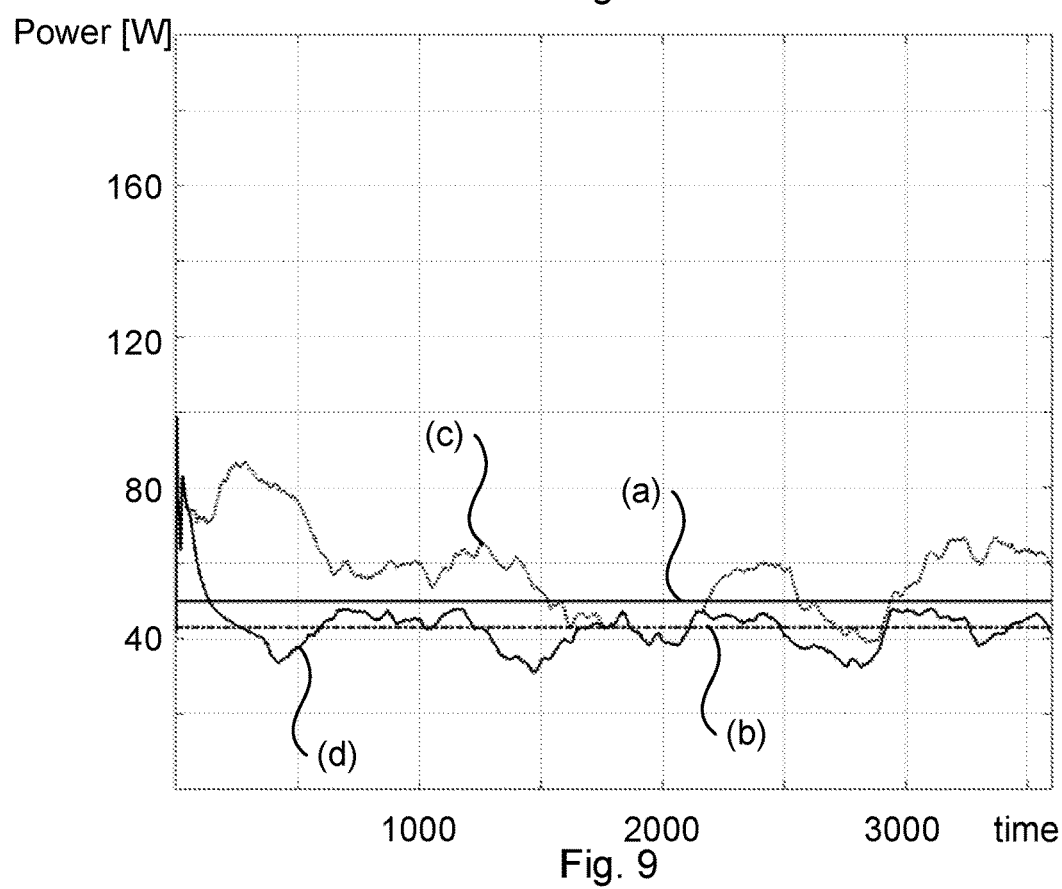

In order to illustrate the performance of the herein disclosed embodiments using a PD controller in step S108 and a dynamic threshold actuator, a reference simulation was first performed for an averaging window of 6 minutes using a sampling period of 0.5 seconds. The following typical values were used in the simulations: $P_{max,site}=200$ W, $P_{average,threshold}=50$ W, $\delta_1=0.225$, $\delta_2=0.170$, $\langle P_{tot}\rangle^{ref}=0.215 \cdot P_{max,site}=43$ W. The result of the simulation appears in FIG. 8 and FIG. 9. In FIG. 8 is shown (a): dynamic threshold, and (b): uncontrolled momentary power. In FIG. 9 is shown (a): average power threshold, (b): controller setpoint (i.e., the reference power for the controller), (c): uncontrolled total average transmission power (i.e., without application of the herein disclosed embodiments), and (d): controlled total average transmission power. It can be seen from FIG. 9 that the threshold varies smoothly. The control works as intended and keeps the total average transmission power of the radio base station 140 well below the determined threshold to meet regulatory requirements, in this example 50 W.

Figure 10:
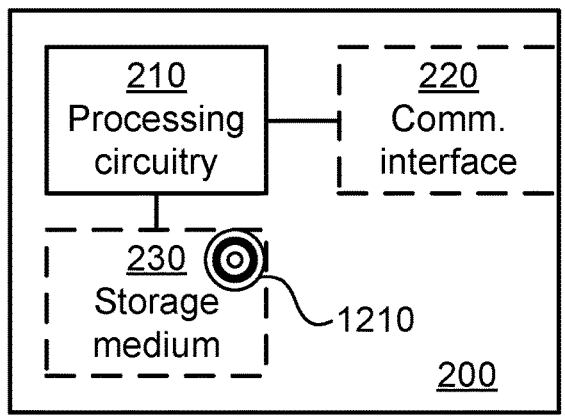
FIG. 10 is a schematic diagram showing functional units of a control device according to an embodiment.

FIG. 10 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices of the communications network 100, such as the radio base station 140. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 11:
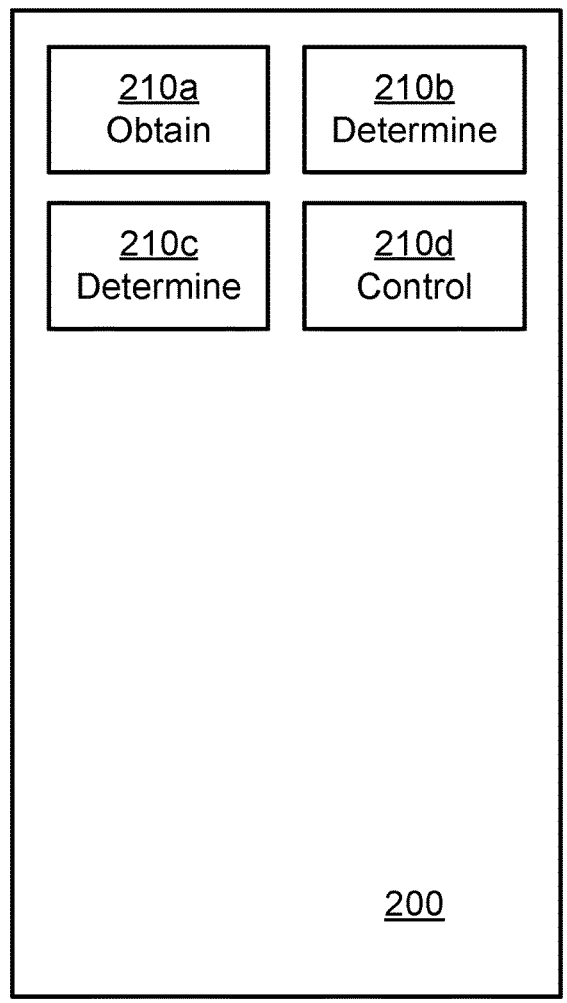
FIG. 11 is a schematic diagram showing functional modules of a control device according to an embodiment.

FIG. 11 schematically illustrates, in terms of a number of functional modules, the components of a control device 200 according to an embodiment. The control device 200 of FIG. 11 comprises a number of functional modules; an obtain module 210a configured to perform step S102, a determine module 210b configured to perform step S104, a determine module 210C configured to perform step S106, and a control module 210d configured to perform step S108. The control device 200 of FIG. 11 may further comprise a number of optional functional modules. In general terms, each functional module 210a-210d may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The control device 200 may be provided as a standalone device or as a part of at least one further device. For example, the control device 200 may be provided in a node of the radio access network or in a node of the core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 10 the processing circuitry 210 may be distributed among a plurality of devices, or nodes. The same applies to the functional modules 210a-210d of FIG. 11 and the computer program 1220 of FIG. 12.

Figure 12:
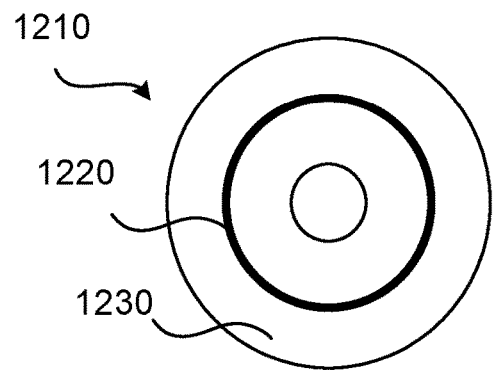
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling total average transmission power $\langle P_{tot}\rangle(t)$ of a radio base station over a fixed time period, the method being performed by a control device, the method comprising:
   obtaining values of average total transmission power of at least one previous transmission from the radio base station;
   determining a resource factor value γ(t) from the value of average total transmission power and a setpoint value $\langle P_{tot}\rangle^{ref}$ of the average total transmission power $\langle P_{tot}\rangle(t)$, by calculating $\delta_2 P_{max,site} \leq \langle P_{tot}\rangle^{ref} \leq \delta_1 P_{max,site}$, where $P_{max,site}$ denotes maximum transmission power of the radio base station, $\delta_1$ and $\delta_2$ are set threshold values, and γ(t) is set to 1 at $\delta_1 P_{max,site}$;
   determining, based on the resource factor value y(t), an action that restricts an amount of code-division multiple access (CDMA) resources to be used at least for a current transmission; and
   controlling the total average transmission power over the fixed time period by initiating enabling of the determined action at least for the current transmission when $\langle P_{tot}\rangle(t) > \delta_1 P_{max,site}$ and disabling the determined action when $\langle P_{tot}\rangle(t) < \delta_2 P_{max,site}$.

2. The method according to claim 1, wherein the resource factor value y(t) expresses which fraction of all available of CDMA resources to be used for the current transmission and wherein the action restricts the amount of CDMA resources to said fraction of all available of CDMA resources.

3. The method according to claim 1, wherein the CDMA resources are associated with codes in a code tree and wherein the action involves restricting how many of the codes in the code tree that are available for the current transmission.

4. The method according to claim 1, wherein the CDMA resources are associated with transmission time intervals (TTIs) and wherein the action involves restricting the current transmission to a fraction of the TTIs.

5. The method according to claim 1, wherein the CDMA resources are associated with a user data rate and wherein the action involves using a user data rate lower than that determined for the current transmission.

6. The method according to claim 1, wherein the CDMA resources are associated with a code rate and wherein the action involves using a code rate higher than needed for the current transmission.

7. The method according to claim 1, wherein the radio base station serves a group of terminal devices and wherein the action is collectively determined for all terminal devices in the group of terminal devices.

8. The method according to claim 1, wherein the radio base station serves a group of terminal devices and wherein the action is individually determined for at least one terminal device in the group of terminal devices.

9. The method according to claim 1, wherein the CDMA resources are allocatable for transmission of control signaling and data signaling.

10. The method according to claim 9, wherein a restriction of amount of CDMA resources is most prioritized for those of the CDMA resources that are allocatable for transmission of one or more of data signaling and voice signaling.

11. The method according to claim 9, wherein a restriction of amount of CDMA resources is least prioritized for those of the CDMA resources that are allocatable for transmission of control signaling.

12. The method according to claim 1, wherein the resource factor value y(t) is lower-bounded by a minimum value $0 \leq y_{low}$ and upper-bounded by 1 such that:

$$y_{low} \leq y(t) \leq 1.$$

13. The method according to claim 12, wherein the resource factor value y(t) is set to its minimum value when the value of average total transmission power is larger than a power threshold value.

14. The method according to claim 1, wherein the values of average transmission power are based on measurements made at input to an antenna array of the radio base station.

15. The method according to claim 1, wherein the values of average transmission power are predicted.

16. The method according to claim 1, wherein the controlling is of proportional-derivative (PD) type.

17. The method according to claim 1, wherein the controlling is of derivative (D) type.

18. The method according to claim 1, wherein the controlling is selectively enabled and disabled.

19. A control device for controlling total average transmission power $\langle P_{tot}\rangle(t)$ of a radio base station over a fixed time period, the control device comprising: processing circuitry; and
   a memory comprising instructions which, when executed by the processing circuitry, cause the control device to:
      obtain values of average total transmission power of at least one previous transmission from the radio base station;
      determine a resource factor value y(t) from the value of average total transmission power and a setpoint value $\langle P_{tot}\rangle^{ref}$ of the average total transmission power $\langle P_{tot}\rangle(t)$, by calculating $\delta_2 P_{max,site} \leq \langle P_{tot}\rangle^{ref} \leq \delta_1 P_{max,site}$, where $P_{max,site}$ denotes maximum transmission power of the radio base station, $\delta_1$ and $\delta_2$ are set threshold values, and γ(t) is set to 1 at $\delta_1 P_{max,site}$;
      determine, based on the resource factor value y(t), an action that restricts an amount of code-division multiple access (CDMA) resources to be used at least for a current transmission; and
      control the total average transmission power over the fixed time period by initiating enabling of the determined action at least for the current transmission when $\langle P_{tot}\rangle(t) > \delta_1 P_{max,site}$ and disabling the determined action when $\langle P_{tot}\rangle(t) < \delta_2 P_{max,site}$.

20. A non-transitory machine readable storage medium comprising computer code which, when run on a processing circuitry of a control device, causes the control device to perform operations to control total average transmission power $\langle P_{tot}\rangle(t)$ of a radio base station over a fixed time period by performing operations comprising:
   obtaining values of average total transmission power of at least one previous transmission from the radio base station;
   determining a resource factor value y(t) from the value of average total transmission power and a setpoint value $\langle P_{tot}\rangle^{ref}$ of the average total transmission power $\langle P_{tot}\rangle(t)$, by calculating $\delta_2 P_{max,site} \leq \langle P_{tot}\rangle^{ref} \leq \delta_1 P_{max,site}$, where $P_{max,site}$ denotes maximum transmission power of the radio base station, $\delta_1$ and $\delta_2$ are set threshold values, and γ(t) is set to 1 at $\delta_1 P_{max,site}$;
   determining, based on the resource factor value y(t), an action that restricts an amount of code-division multiple access (CDMA) resources to be used at least for a current transmission; and controlling the total average transmission power over the fixed time period by initiating enabling of the determined action at least for the current transmission when $\langle P_{tot}\rangle(t) > \delta_1 P_{max,site}$ and disabling the determined action when $\langle P_{tot}\rangle(t) < \delta_2 P_{max,site}$.

* * * * *